Patented Apr. 24, 1951

2,550,267

UNITED STATES PATENT OFFICE 2,550,267

PRESERVATION OF FOOD PRODUCTS

Lloyd B. Jensen, Chicago, Ill., and William A. Miller, Manhattan, Kans., assignors to Swift & Company, Chicago, Ill., a corporation of Illinois No Drawing. Application November 10, 1948, Serial No. 59,410

6 Claims. (Cl. 99—150)

The present invention relates to the preparation and use of an antibiotic substance, and more particularly to the preparation and use of an antimicrobial substance of plant origin.

The invention contemplates the utilization of an antibiotic substance naturally associated with tissues of the plant *Cetraria islandica*, commonly called Iceland moss.

Therefore, an object of the present invention is to provide a potent antibiotic substance of plant origin.

A further object of the invention is to provide an antibiotic substance which is non-toxic to humans.

An additional object of the invention is to provide an antibiotic substance which is heat stable.

Another object of the invention is to employ an antibiotic substance having an origin in a vegetative plant as an effective preservative for food products.

In achieving the objects of the present invention, finely cut or ground Iceland moss is treated with a suitable nonaqueous organic solvent such as acetone. The acetone layer containing the constituents of the plant tissue soluble therein is separated from the acetone-insoluble fibrous mass, the acetone removed therefrom, and the extract taken up in a carrier solvent, such as ethanol.

The following example illustrates a preferred embodiment of the invention, and the tests falling thereunder illustrate the potency of the material obtained in accordance with the processes of the example.

*Example.*—150 grams of the Iceland moss were finely ground. The ground moss was then placed in a flask and covered with acetone. The flask was held at room temperature for approximately 48 hours and shaken at intervals. The acetone layer containing the acetone-soluble constituents of the Iceland moss was separated from the insoluble material by filtration, and the acetone was distilled off at 42° C. The residue was taken up in ethyl alcohol (95 per cent) so that 1 ml. of the alcoholic extract contained the acetone soluble material in 5 grams of the original Iceland moss.

In order to evaluate the effectiveness of the antibiotic material in the alcohol solution obtained in accordance with the example, the following test was performed:

Serial dilutions of the extract were made in 10 cc. broth tubes and the tubes inoculated with bacteria. Each 10 ml. broth tube contained approxmiately 75,000 cells of a food poisoning strain of *Staphylococcus aureus, Clostridium sporogenes, Bacillus niger, Aspergillus niger, Aspergillus glaucus, Penicillium camemberti,* and *Penicillium notatum*. The tubes were allowed to incubate at a temperature of 37° C. and inspected for bacterial growth at the end of 1, 2, 5 and 8 days. In the following table are tabulated the results obtained with the aforesaid bacteria. The minus signs in said table indicate no bacterial growth, and the positive signs indicate the presence of viable bacteria at the incubation periods specified.

*Table I*

| Dilution 1: | Incubation days | Staphylococcus Aureus | B. niger | Cl. sporogenes | Penicillium notatum | Penicillium camemberti | Aspergillus glaucum | Aspergillus niger | All controls |
|---|---|---|---|---|---|---|---|---|---|
| 100 | 1 | − | − | − | − | − | − | − | + |
|  | 2 | − | − | − | − | − | − | − |  |
|  | 3 | − | − | − | + | + | + | + |  |
|  | 6 | − | − | − |  |  |  |  |  |
|  | 7 | − | − | − |  |  |  |  |  |
|  | 8 | − | − | − |  |  |  |  |  |
| 500 | 1 | − | − | − | − | ± | ± | ± | ± |
|  | 2 | − | + | − |  |  |  |  |  |
|  | 3 | − | − | − |  |  |  |  |  |
|  | 6 | − | − | − |  |  |  |  |  |
|  | 7 | − | − | − |  |  |  |  |  |
|  | 8 | − | − | − |  |  |  |  |  |
| 1,000 | 1 | − | − | − | + | ± | ± | ± | ± |
|  | 2 | − | + | − |  |  |  |  |  |
|  | 3 | − | − | − |  |  |  |  |  |
|  | 6 | − | − | + |  |  |  |  |  |
|  | 7 | − | − | + |  |  |  |  |  |
|  | 8 | − | − | + |  |  |  |  |  |
| 2,000 | 1 | − | + | + | + | ± | ± | ± | ± |
|  | 2 | − |  |  |  |  |  |  |  |
|  | 3 | + |  |  |  |  |  |  |  |
|  | 6 | + |  |  |  |  |  |  |  |
|  | 7 | + |  |  |  |  |  |  |  |
|  | 8 | + |  |  |  |  |  |  |  |

Iceland moss antibiotic shows marked activity against certain gram positive bacteria although the data given in the above table indicate that the effects of the Iceland moss antibiotic vary in The foregoing tests indicate that the antibiotic preparation exert a pronounced inhibiting action against the *Staphylococcus aureus* in cream fillings.

Obviously, many modifications and variations of the invention, as hereinbefore set forth, may be made without departing from the spirit and scope thereof, and therefore only such limitations should be imposed as are indicated in the appended claims.

We claim:

1. In the process of treating food products, the step of adding to a food product a small amount of an alcoholic solution of antibiotic substance derived from the plant *Cetraria islandica* to preserve said food product against pathogenic bacteria responsible for food poisoning and spoilage.

2. In the process of quick-curing meats, wherein a pickling solution is injected into said meat, the step of adding to said pickling solution a small amount of the antibiotic substance derived from a plant *Cetraria islandica* by treatment with a non-aqueous organic solvent whereby the growth of pathogenic bacteria responsible for food spoilage and poisoning in the meat is substantially retarded.

3. In the process of preparing pastries containing fillings subject to spoilage by pathogenic bacteria, the step of adding to the said filling a small amount of the antibiotic substance derived from the plant *Cetraria islandica* by treatment with a non-aqueous organic solvent whereby the growth of pathogenic bacteria is substantially retarded.

4. A meat pickle including a small amount of an antibiotic substance derived from the plant *Cetraria islandica* by treatment with a non-aqueous organic solvent.

5. A cream filling for pastries including a small amount of an antibiotic substance derived from the plant *Cetraria islandica* by treatment with a non-aqueous organic solvent.

6. In the process of treating food products, the step of adding to a food product a small amount of an antibiotic substance derived from the plant *Cetraria islandica* by treatment with a non-aqueous organic solvent to preserve said food product against pathogenic bacteria responsible for food poisoning and spoilage.

LLOYD B. JENSEN.
WILLIAM A. MILLER.

REFERENCES CITED

The following references are of record in the file of this patent:

UNITED STATES PATENTS

| Number | Name | Date |
|---|---|---|
| 469,850 | Chesebrough | Mar. 1, 1892 |
| 2,084,864 | Paddock | June 22, 1937 |
| 2,098,110 | Schertz et al. | Nov. 2, 1937 |
| 2,117,478 | Hall | May 17, 1938 |
| 2,180,750 | Urbain | Nov. 21, 1939 |

OTHER REFERENCES

"Nature," May 13, 1944, vol. 153, page 598, article entitled "Antibacterial Substances in Green Plants."

"Chemical and Engineering News," September 1945, page 1622, article entitled "Penicillin as a Preservative."

"The American Woman's Cook Book," 1945, by Ruth Berolzheimer, published by Consolidated Book Publishers, Chicago, page 475.